United States Patent [19]

Nakamura et al.

[11] Patent Number: 5,521,130
[45] Date of Patent: May 28, 1996

[54] DIELECTRIC MATERIAL FOR HIGH FREQUENCIES

[75] Inventors: Tetsuro Nakamura; Mitsuru Itoh, both of Yokahama; Yoshiyuki Inaguma, Yamato, all of Japan; Kyung Y. Kim, Seoul; Sang O. Yoon, Kangreung, both of Rep. of Korea

[73] Assignee: Korea Institute of Science & Technology, Seoul, Rep. of Korea

[21] Appl. No.: 495,941

[22] Filed: Jun. 28, 1995

[30] Foreign Application Priority Data

Jul. 27, 1994 [KR] Rep. of Korea ................ 18289/1994

[51] Int. Cl.$^6$ .................................................. C04B 35/465
[52] U.S. Cl. .......................... 501/136; 501/134; 501/135
[58] Field of Search .................................. 501/134, 135, 501/136

[56] References Cited

U.S. PATENT DOCUMENTS 4,030,937  6/1977  Nakai et al. ............................. 501/136
4,670,409  6/1987  Okawa et al. ........................... 501/136

FOREIGN PATENT DOCUMENTS 51-30394   3/1976  Japan ...................................... 501/136
51-069199  6/1976  Japan ...................................... 501/136
57-154711  9/1982  Japan ...................................... 501/136
60-088401  5/1985  Japan ...................................... 501/136
3-008766   1/1991  Japan .................................... C04B 35/46

*Primary Examiner*—Anthony Green
*Attorney, Agent, or Firm*—Scully, Scott, Murphy & Presser

[57] ABSTRACT

There is disclosed a dielectric material for high frequencies comprising a composition system represented by the following formula:

$$(1-Y)SrTiO_3 - Y(La_{1-x}Nd_x)(Mg_{1/2}Ti_{1/2})O_3$$

wherein
 $0.01 \leq X < 1.0$ and
 $0.4 \leq Y \leq 0.55$.

1 Claim, 1 Drawing Sheet

DIELECTRIC MATERIAL FOR HIGH FREQUENCIES

BACKGROUND OF THE INVENTION

1. Field of the invention

The present invention relates, in general, to a dielectric material for high frequencies and, more particularly, to a dielectric material for high frequencies which possesses high quality factor Q and exhibits superior temperature coefficient of resonant frequency even in high frequency regions.

2. Description of the Prior Art

In recent years, there have been rapidly developed communication systems using microwaves (frequency band ranging from 300 MHz to 300 GHz), such as wireless telephones, car phones, cellular phones, satellite broadcasting systems, and the like, and there is an increasing demand for dielectric ceramics with better electrical properties, which are extensively used in resonator devices, band pass filters, microwave integrated circuits and other parts of communication systems.

For application for communication systems using microwaves, a dielectric material for high frequencies needs to satisfy the following conditions:

1. A large dielectric constant for the miniaturization of parts of communication systems because the wave length of the microwaves in a dielectric material is inversely proportional to the square root of the dielectric constant;
2. A high Q value (reciprocal of dielectric loss) for high performance because dielectric loss is proportional to frequency;
3. A small temperature coefficient of resonant frequency, so as to obtain desired resonant characteristics which are stable to temperature change.

In addition, it is required that the dielectric material for high frequencies is resistant to ageing, large in thermal conductivity and high in mechanical strength.

Well known representative dielectric materials for high frequencies will be exemplified.

On the one hand, the following are known as dielectric materials which are low in dielectric loss but have a dielectric constant of not more than 40:

i. A $Ba(M^{+2}_{1/3}M^{+5}_{2/3})O_3$ system wherein $M^{+2}$=Mg or Zn, $M^{+5}$=Ta or Nb [reference: K. Matsumoto, T. Hiuga, K. Takada and H. Ichimura, "$Ba(Mg_{1/3}Ta_{2/3})O_3$ Ceramics with Ultra-low Loss at Microwave Frequencies" In Proce. of the Sixth IEEE International Symposium on Applications of Ferroelectrics, pp. 118~121, (1986)].

ii. A $Ba_2Ti_9O_{20}$ system [reference: S. Nisikaki et al., "$BaO-TiO_2-WO_3$ Microwave Ceramics and Crystalline $BaWO_4$" J. Am. Ceram. Soc., 71(1), C-11-C-17 (1988)].

iii. A $(Zr,Sn)TiO_4$ system [reference: K. Wakino et al., "Microwave Characteristics of $(Zr,Sn)TiO_4$ and $BaO-PbO-Nd_2O_3-TiO_2$ Dielectric Resonators" J. Am. Ceram. Soc. 67(4), 278~281 (1983)].

On the other hand, the following are known as dielectric materials which have a dielectric constant of not less than 80 yet are relatively high in dielectric loss (Q×fo (GHz)<10,000):

i. A $BaO-Sm_2O_3-TiO_2$ system [reference: J. M. Wu and M. C. Chang, "Reaction Sequence and Effects of Calcination and Sintering on Microwave Properties of $(Ba,Sr)O-Sm_2O_3-TiO_2$ Ceramics" J. Am. Ceram. Soc., 73(6), 1599~1605 (1990)].

ii. A $(Ba,Pb)O-Nd_2O_3-TiO_2$ system [reference: K. Wakino et al., "Microwave Characteristics of $(Zr,Sn)TiO_4$ and $BaO-PbO-Nd_2O_3-TiO_2$ Dielectric Resonators" J. Am. Ceram. Soc. 67(4), 278~281 (1983)].

iii. A $(Pb,Ca)ZrO_3$ system [reference: J. Kato, "Material Produces Small Resonators with High Dielectric Constant" JEE, September 114~118 (1991)].

Dielectric ceramics for high frequencies having high dielectric constants are suitable as materials for microwave devices using electric waves of long wavelength and are in great demand in devices for communication systems requiring miniaturization.

However, it is very difficult to develop dielectric materials having stable temperature coefficients of resonant frequency as well as high dielectric constants and high Q values. Generally, dielectric losss and temperature coefficients of resonant frequency in dielectric materials having large dielectric constants, both increase because of dipole coupling therein. That is to say, since materials with high dielectric constants are inclined to have low Q values and large temperature coefficients of resonant frequency, it is very difficult to satisfy the three desired electrical properties in a single material system.

For application in communication systems, however, dielectric materials for high frequencies, first of all, must have stable temperature coefficients of resonant frequency.

Of the known conventional dielectric compositions, in fact, a material satisfying the three desired electrical properties at same time has not been found. For example, a $SrTiO_3$ system exhibits satisfactory dielectric constant which is 255 at 2 GHz, but is problematic in that the temperature coefficient of resonant frequency is too large as 1670 ppm/°C. On the other hand, a $(Li_{1-x}Nd_x)(Mg_{1/2}Ti_{1/2})O_3$ system exhibits a low dielectric constant in a range of 24–28, however, it has a high quality factor (Q×fo) in a range of 65,000 to 80,000 and a temperature coefficient of resonant frequency in a range of −53 to −58 ppm/°C.

SUMMARY OF THE INVENTION

Therefore, an object of the present invention is to make the best of the $SrTiO_3$ and $(La_{1-x}Nd_x)(Mg_{1/2}Ti_{1/2})O_3$ substances as well as to overcome the above problems encountered in prior arts and to provide a novel dielectric material, capable of exhibiting a dielectric constant of not less than 40 yet a small dielectric loss and easily controlling a temperature coefficient of resonant frequency into positive and negative values according to demand.

Based on the intensive and thorough study by the present inventors, the above object could be accomplished by a provision of a dielectric material for high frequencies comprising a composition system represented by the following formula:

$$(1-Y)SrTiO_3 - Y(La_{1-x}Nd_x)(Mg_{1/2}Ti_{1/2})O_3$$

wherein
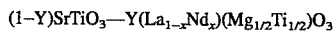
$0.01 \leq X < 1.0$ and
$0.4 \leq Y \leq 0.55$.

DETAILED DESCRIPTION OF THE INVENTION

Figure 1:
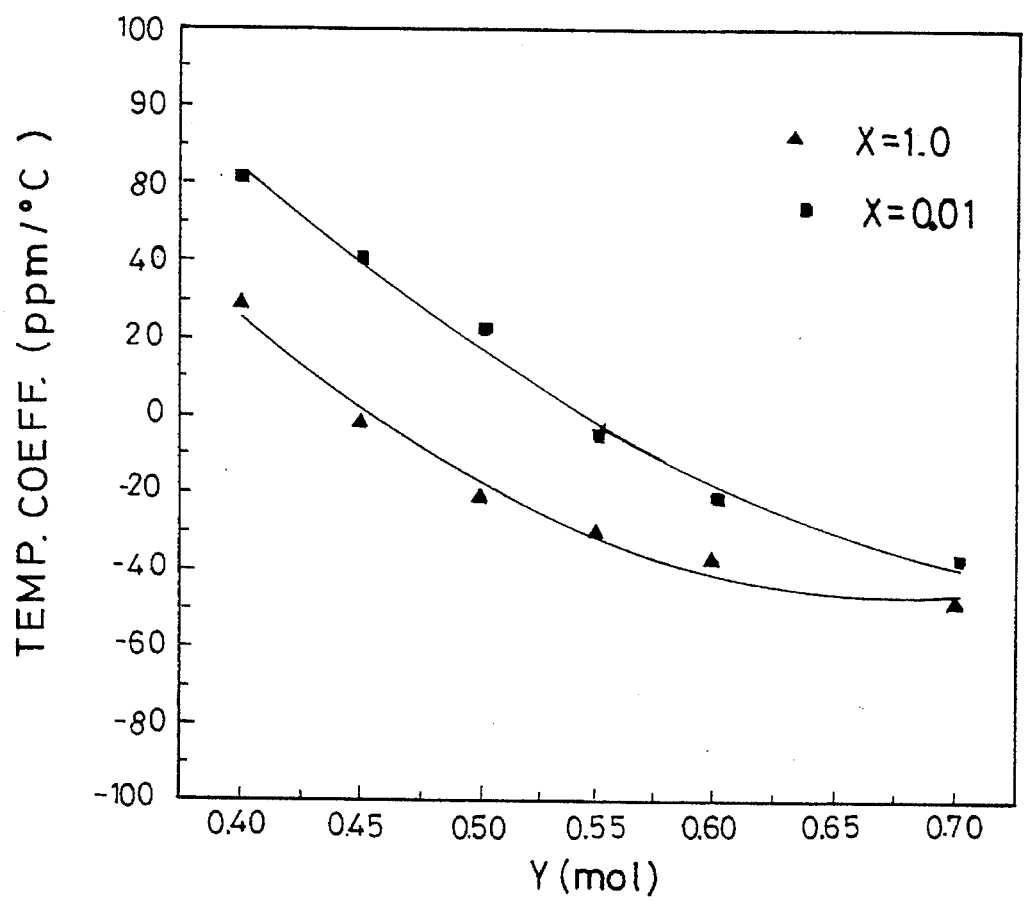
FIG. 1 is a graph showing a temperature coefficient depending composition of the components of the present invention.

The present invention provides a perovskite type dielectric material comprising a composition system which comprises $(1-Y)SrTiO_3$—$Y(La_{1-x}Nd_x)(Mg_{1/2}Ti_{1/2})O_3$ wherein $0.01 \leq X < 1.0$ and $0.4 \leq Y \leq 0.55$.

The three components of $SrTiO_3$, $La(Mg_{1/2}Ti_{1/2})O_3$ and $Nd(Mg_{1/2}Ti_{1/2})O_3$ with the amount as mentioned above allows dielectric materials to be superior in the dielectric properties including dielectric constant, dielectric loss and temperature coefficient of resonant frequency. In addition, the value of the temperature coefficient of resonant frequency in the dielectric material can be easily either positive or negative by controlling, according to the present invention.

The preferred embodiments of the present invention will now be further described with reference to specific examples.

Other features, advantages and embodiments of the invention disclosed herein will be readily apparent to those exercising ordinary skill after reading the foregoing disclosures.

EXAMPLE

Powdery $SrCO_3$, $La_2O_3$, $Nd_2O_3$, $TiO_2$ and $MgO$, all having a purity of above 99.9%, were so weighed in a balance as to give compositions shown in the following Table 1 and mixed. The powder mixtures were calcined at 1,050° C. for 10 hours in air, then pulverized and calcined at a temperature of 1,200° to 1,300° C. for 6 hours, again, to produce perovskite type solid solutions.

Following pulverization, each of the solid solutions was molded under pressure into a disk type specimen with a diameter of 10 mm and a thickness of 1 to 2 mm which was subsequently sintered at a temperature of 1,550° to 1,650° C. for a period of 2 to 6 hours in air. The sintering temperature was raised as the content of MgO was increased. After the sintering, the specimens exhibited contraction rates ranging from 12 to 20%.

Opposite faces of the specimens were well polished with an abrasive paper (up to #3000) and then, they were tested by a Hakki-Coleman method for dielectric constant, Q value and temperature coefficient of resonant frequency at a frequency of 8 to 12 GHz and at a temperature of −15° to 85° C. The results are given as shown in the following Table 1.

TABLE 1

Dielectric Properties of $(1-Y)SrTiO_3$—$Y(La_{1-x}Nd_x)(Mg_{1/2}Ti_{1/2})O_3$ system

| Specimen No | Composition (mol) X | Y | Dielectric Const. ($\epsilon_r$) | Q × fo (GHz) | TCF (ppm/°C.) |
|---|---|---|---|---|---|
| 1 | 0.01 | 0.4 | 51.8 | 45360 | 60.8 |
| 2 | 0.01 | 0.45 | 47.6 | 42020 | 39.6 |
| 3 | 0.01 | 0.5 | 44.9 | 38470 | 21.45 |
| 4 | 0.01 | 0.55 | 42.6 | 42350 | −4.23 |
| 5 | 0.01 | 0.6 | 39.9 | 58660 | −21.01 |
| 6 | 0.01 | 0.7 | 34.3 | 63200 | −39.1 |
| 7 | 0.25 | 0.4 | 51.8 | 39520 | 50.4 |
| 8 | 0.25 | 0.45 | 47.4 | 38910 | 28.9 |
| 9 | 0.25 | 0.5 | 44.4 | 38180 | 9.8 |
| 10 | 0.25 | 0.55 | 41.9 | 41690 | −11.1 |
| 11 | 0.25 | 0.6 | 38.8 | 54660 | −24.4 |
| 12 | 0.25 | 0.7 | 33.6 | 59250 | −41.6 |
| 13 | 0.5 | 0.4 | 51.8 | 33640 | 44.74 |
| 14 | 0.5 | 0.45 | 47.2 | 35820 | 19.6 |
| 15 | 0.5 | 0.5 | 44.1 | 37880 | −1.7 |
| 16 | 0.5 | 0.55 | 41.5 | 41060 | −16.4 |
| 17 | 0.5 | 0.6 | 38.1 | 50730 | −27.5 |
| 18 | 0.5 | 0.7 | 32.9 | 57310 | −45.0 |
| 19 | 0.75 | 0.4 | 51.7 | 27760 | 39.8 |
| 20 | 0.75 | 0.45 | 47.3 | 32710 | 11.3 |
| 21 | 0.75 | 0.5 | 43.9 | 37550 | −10.5 |
| 22 | 0.75 | 0.55 | 41.2 | 40420 | −23.6 |
| 23 | 0.75 | 0.6 | 37.2 | 47010 | −33.8 |
| 24 | 0.75 | 0.7 | 31.8 | 54390 | −46.47 |
| 25 | 1.0 | 0.4 | 51.7 | 21800 | 34.2 |
| 26 | 1.0 | 0.45 | 47.3 | 29590 | −2.32 |
| 27 | 1.0 | 0.5 | 43.4 | 37300 | −21.3 |
| 28 | 1.0 | 0.55 | 40.5 | 39820 | −30.4 |
| 29 | 1.0 | 0.6 | 36.6 | 43300 | −37.8 |
| 30 | 1.0 | 0.7 | 31.4 | 51460 | −48.9 |

What is claimed is:

1. A dielectric material for high frequencies comprising a composition system represented by the following formula:

$$(1-Y)SrTiO_3 — Y(La_{1-x}Nd_x)(Mg_{1/2}Ti_{1/2})O_3$$

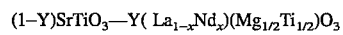

wherein
$0.01 \leq X < 1.0$ and
$0.4 \leq Y \leq 0.55$.

* * * * *